(12) United States Patent
Becnel

(10) Patent No.: US 8,721,379 B2
(45) Date of Patent: May 13, 2014

(54) ELECTRONIC FLUID ACTIVATED RELEASE DEVICE FOR LIFE PRESERVER

(76) Inventor: Steven A. Becnel, Belle Chase, LA (US)

( * ) Notice: Subject to any disclaimer, the term of this patent is extended or adjusted under 35 U.S.C. 154(b) by 0 days.

(21) Appl. No.: 13/285,816

(22) Filed: Oct. 31, 2011

(65) Prior Publication Data

US 2012/0217263 A1 Aug. 30, 2012

Related U.S. Application Data

(60) Provisional application No. 61/410,647, filed on Nov. 5, 2010.

(51) Int. Cl.
*B67B 7/50* (2006.01)

(52) U.S. Cl.
USPC ......... 441/93; 441/94; 441/95; 222/5; 222/54

(58) Field of Classification Search
USPC .......... 222/5, 54; 441/93, 94, 97, 96, 98, 100, 441/95
See application file for complete search history.

(56) References Cited

U.S. PATENT DOCUMENTS

| | | | | |
|---|---|---|---|---|
| 3,248,010 A | * | 4/1966 | De Boer | 222/5 |
| 3,602,661 A | * | 8/1971 | Liedberg | 200/61.05 |
| 4,024,440 A | * | 5/1977 | Miller | 361/251 |
| 4,687,451 A | * | 8/1987 | Chen | 441/94 |
| 4,768,128 A | * | 8/1988 | Jankowiak et al. | 361/251 |
| 5,026,310 A | * | 6/1991 | Mackal et al. | 441/93 |
| 5,035,345 A | * | 7/1991 | Janko et al. | 222/5 |
| 5,148,346 A | * | 9/1992 | Naab et al. | 361/251 |
| 5,413,247 A | * | 5/1995 | Glasa | 222/5 |
| 5,601,124 A | * | 2/1997 | Weinheimer et al. | 141/19 |
| 5,653,191 A | * | 8/1997 | Calhoun et al. | 116/272 |
| 5,685,455 A | * | 11/1997 | Glasa | 222/5 |
| 2008/0000926 A1 | * | 1/2008 | Wang | 222/5 |

* cited by examiner

*Primary Examiner* — Paul R Durand
*Assistant Examiner* — Charles P Cheyney
(74) *Attorney, Agent, or Firm* — Banner & Witcoff, Ltd.

(57) ABSTRACT

A fluid activated automatic release apparatus is configured to release a pressurized gas from a cylinder bottle and/or activating various mechanical release mechanisms. The apparatus may include a liquid sensor component moveably coupled to a cam member; and a piercing pin configured to engage a fluid container, responsive to rotatable movement of the cam member. The apparatus may include a liquid sensor component moveably coupled to a cam member; and a barrel device biased to move linearly responsive to rotatable movement of the cam member.

13 Claims, 10 Drawing Sheets

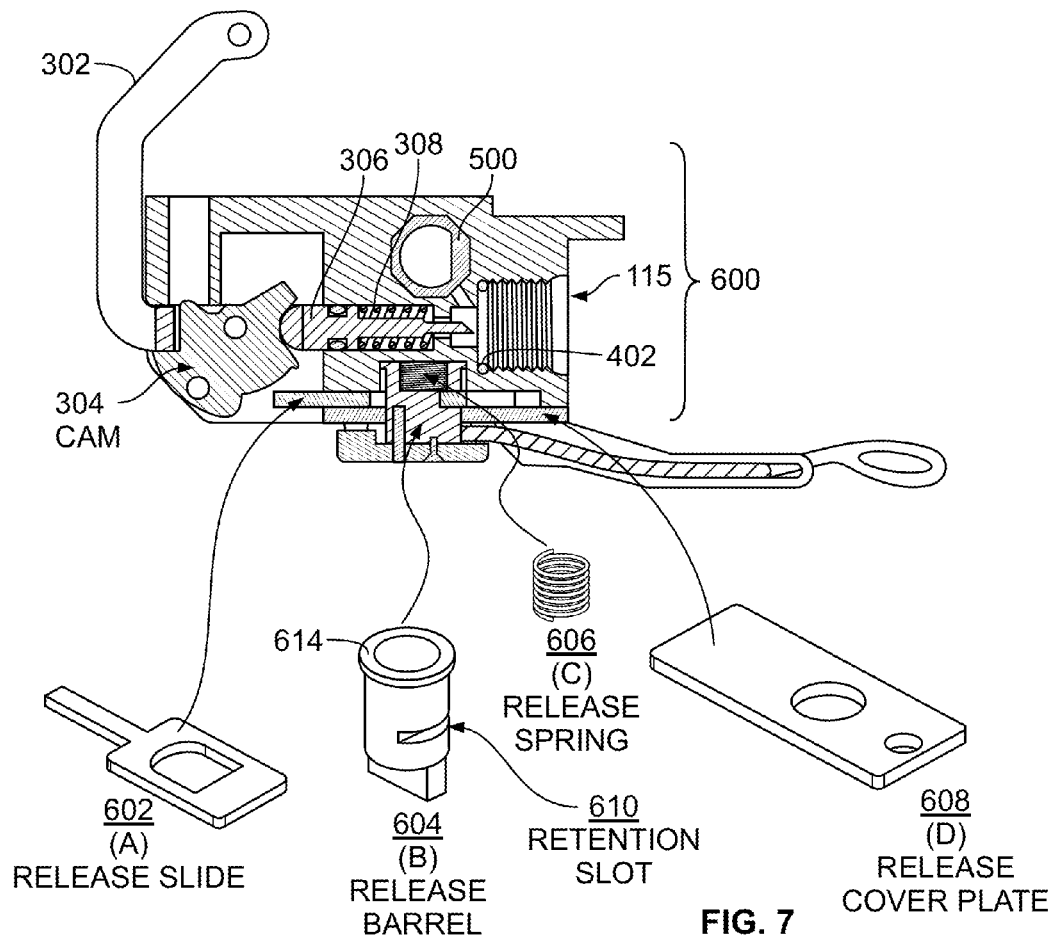
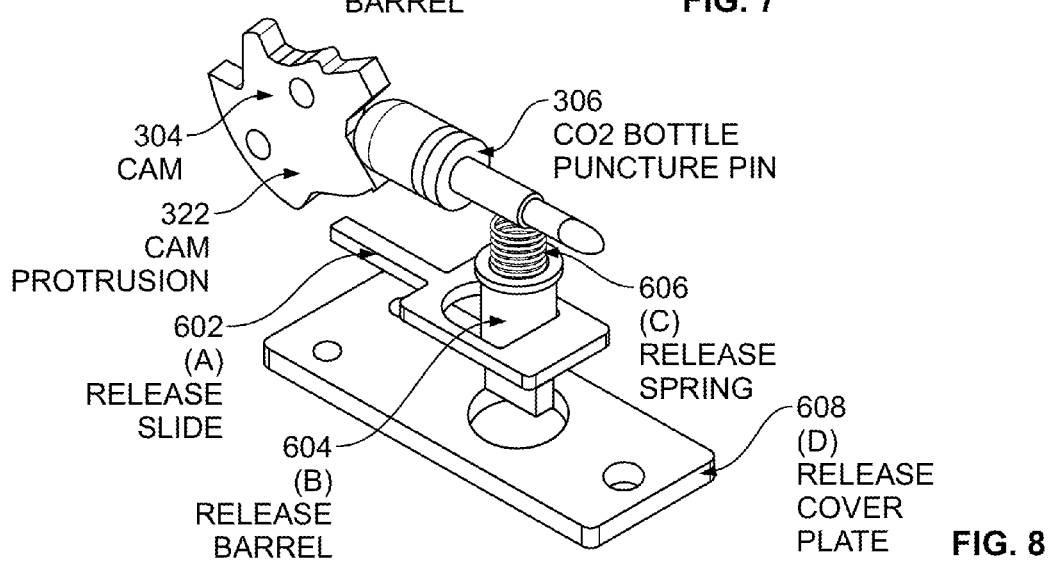

VERTICAL UP POSITION
—500

HORIZONTAL LEFT POSITION
—500

HORIZONTAL RIGHT POSITION
—500

VERTICAL DOWN POSITION
—500

502—  "D" INSERT DETAIL

ELECTRONIC FLUID ACTIVATED RELEASE DEVICE FOR LIFE PRESERVER

CROSS-REFERENCE TO RELATED APPLICATION

This application claims priority of U.S. Provisional Application 61/410,647, filed Nov. 5, 2010, the disclosure of which is incorporated herein by reference.

FIELD

The present invention generally relates to life preservers, and in particular to an electronic fluid activated release device.

BACKGROUND OF THE INVENTION

Life preservers or life vests save lives by preventing individuals from drowning. To accomplish that task, a life preserver should be available for proper use at the time of an accident and should be designed to perform well enough to keep a person's head above of the water. For an inflatable type of life preservers, it needs to inflate when needed. On occasions, however, a person might be an accident such that the individual is rendered unconscious and unable to initiate the inflation of the life vest. There is a critical need for a reliable inflator system for an inflatable life preserver/bladder to save lives.

BRIEF SUMMARY

Aspects of the present invention pertain to a fluid activated automatic release apparatus for releasing a pressurized gas from a cylinder bottle and/or activating various mechanical release mechanisms.

According to one aspect, there is provided an apparatus including a liquid sensor component moveably coupled to a cam member; and a piercing pin configured to engage a fluid container, responsive to rotatable movement of the cam member.

According to one aspect, there is provided an apparatus including a liquid sensor component moveably coupled to a cam member; and a barrel device biased to move linearly responsive to rotatable movement of the cam member.

According to another aspect, there is provided an apparatus including a linear actuator configured to moveably engage the cam member responsive to a liquid being sensed by the liquid sensor component. According to another aspect, the apparatus may include a coil spring surrounding the piercing pin.

According to another aspect, the apparatus may include a lever rotatably coupled to the cam member. This configuration enables by manual activation by pulling of a knob and cord assembly.

According to another aspect, the apparatus may include a multiple positionable insert adapted to receive a fill valve of the life preserver.

According to another aspect, there is provided a method includes steps of sensing water, firing an actuator, rotating a cam member and linearly moving a releasing slide.

BRIEF DESCRIPTION OF THE DRAWINGS

The foregoing summary of the invention as well as the following detailed description of the invention, considered in conjunction with the accompanying drawings, provides a better understanding of the invention, in which like reference numbers refer to like elements, and wherein:

FIG. 7 is a schematic diagram of an alternative release system of an inflator system according to an embodiment of the invention;

FIG. 8 is a schematic view of an alternative release system shown in FIG. 7;

DETAILED DESCRIPTION

FIGS. 1-19B illustrate an embodiment of an inflator system 100 and methods for providing a compressed gas to fill an inflatable flotation device, such as a life preserver. The Inflator system 100 when fluidly coupled to an inflatable life preserver is configured to inflate the life preserver manually or automatically by sensing contact with a fluid, such as water.

Figure 1:
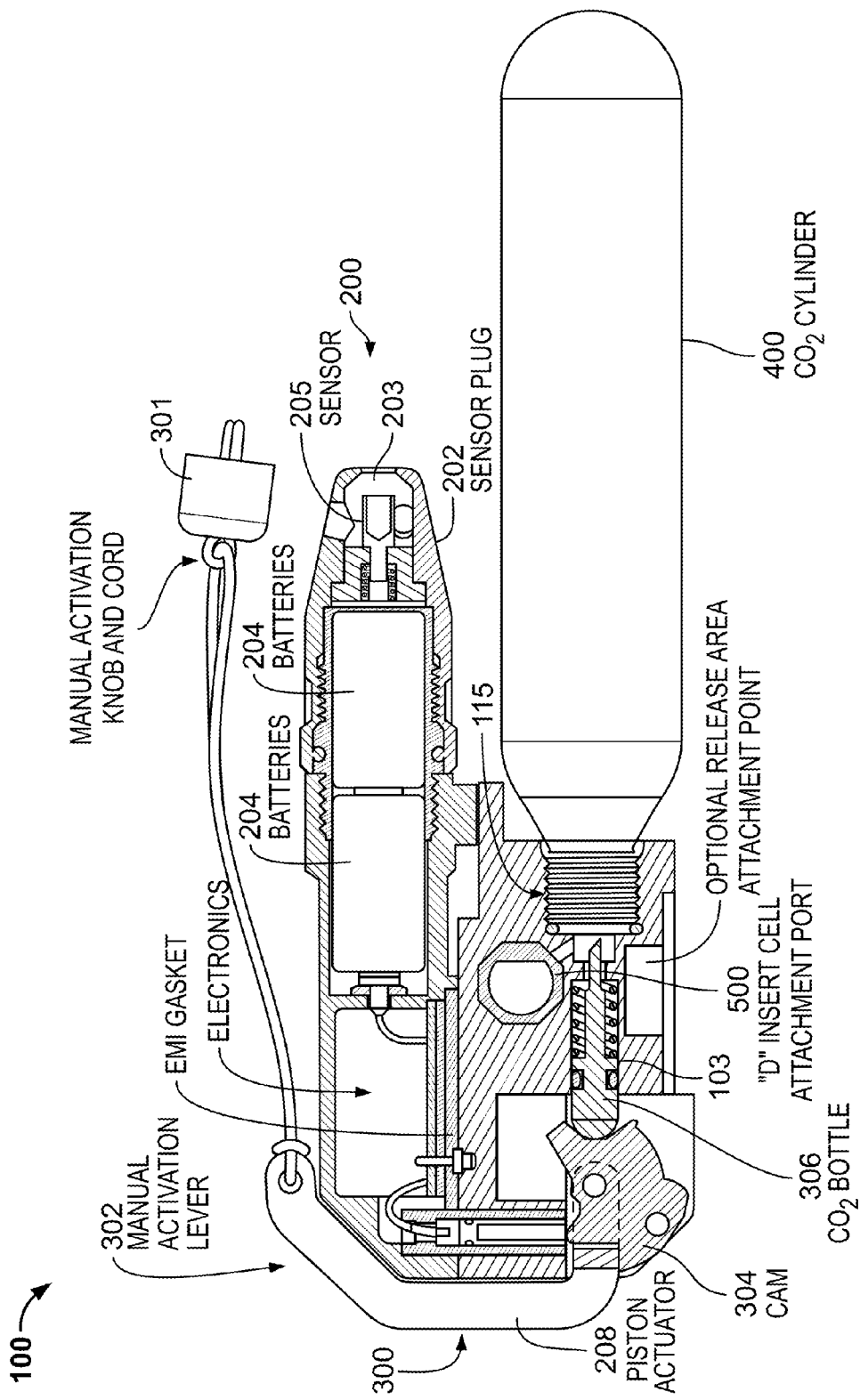
FIG. 1 is a fragmentary cutaway view of an inflator system according to an embodiment of the invention.

To provide a better understanding of the inflator system 100, one construction is described in more detail below. Referring to FIG. 1, inflator system 100 is broadly constructed of a sensing module 200 and/or a mechanical module 300 for performing various functions. Modules 200, 300 can be provided in a common housing or inflator body 102. The inflator system 100 is configured to be used either manually as provided by the mechanical module 300 or automatically as provided by the sensing module 200 to inflate life preserver/bladder 702 (shown in FIG. 16).

Figure 2:
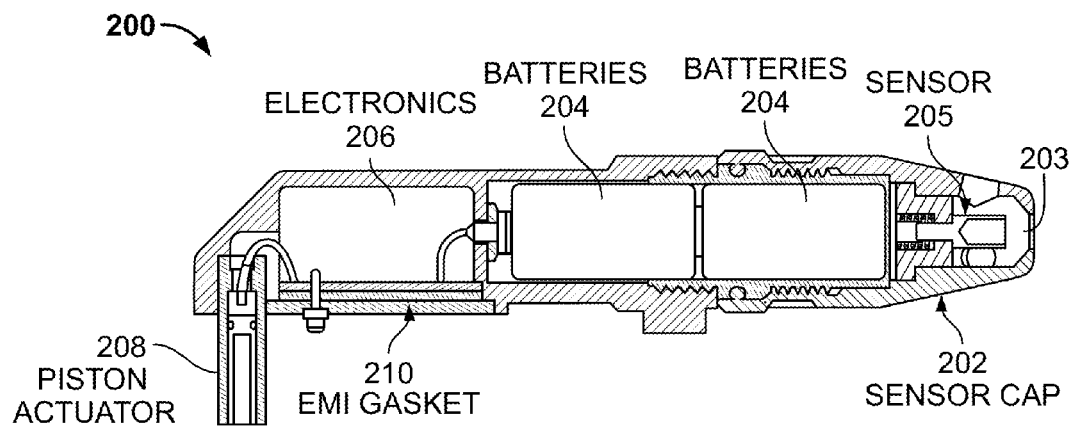
FIG. 2 is a fragmentary cutaway view of a water sensing module of the inflator system of FIG. 1.
Figure 3A:
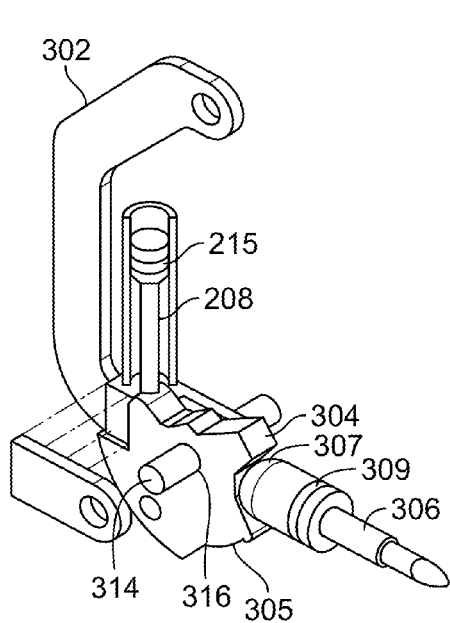
FIGS. 3A and 3B are cutaway views of illustrating a firing action method of operation of the inflator system of FIG. 1 using sensing module shown in FIG. 2.
Figure 3B:
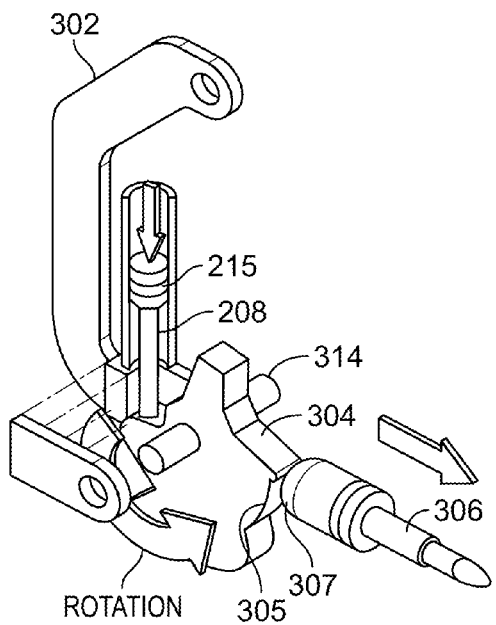

In one construction of the inflator system 100 shown in FIGS. 2 and 3A-3B, the sensing module 200 includes a sensor cap 202, a power source 204 (e.g. batteries), an electrical circuit system 206, a linear actuator 208, and electromagnetic radiation (EMI) gasket 210. The sensor cap 202 has an opening 203 to enable water to enter into water sensor 205. During automatic water activated operation, water completes a firing circuit 207 including water sensing probes P1, P2 of sensor 205 and the inflator components (See FIG. 6). Electrical completion of the circuit triggers, firing circuit 207 that fires the linear actuator 208 with an electrical current discharge from a capacitor C1 (See FIG. 6). The firing of the linear actuator 208 produces ballistic gas that reliably propels a piston in the actuator 208 forwardly and towards cam member 304 The actuator 208 has includes gas seal 215 to increase the ballistic gas for improved operation. The actuator 208 abuts the cam member 304 and impacts it to rotate the cam member 304 counter-clockwise so that it strokes the piercing pin 306 forward through a flexible diaphragm in the end of a metal bottle/tank 400 filled with a pressurized gas, such as carbon dioxide. In same operation as with the mechanical module 300, the pressurized carbon dioxide gas is vented along the piercing pin 306 into gas channel 310 to the "D" port where it is fluidly coupled to an air bladder fill valve to release the gas into the bladder of the life preserver. The bottle 400 is threadly fastened into an inlet port 115 of housing 102. The EMI gasket 210 is provided to protect the circuit system 206 from electromagnetic radiation so that the circuit can operate in adverse EM environments.

Figure 4:
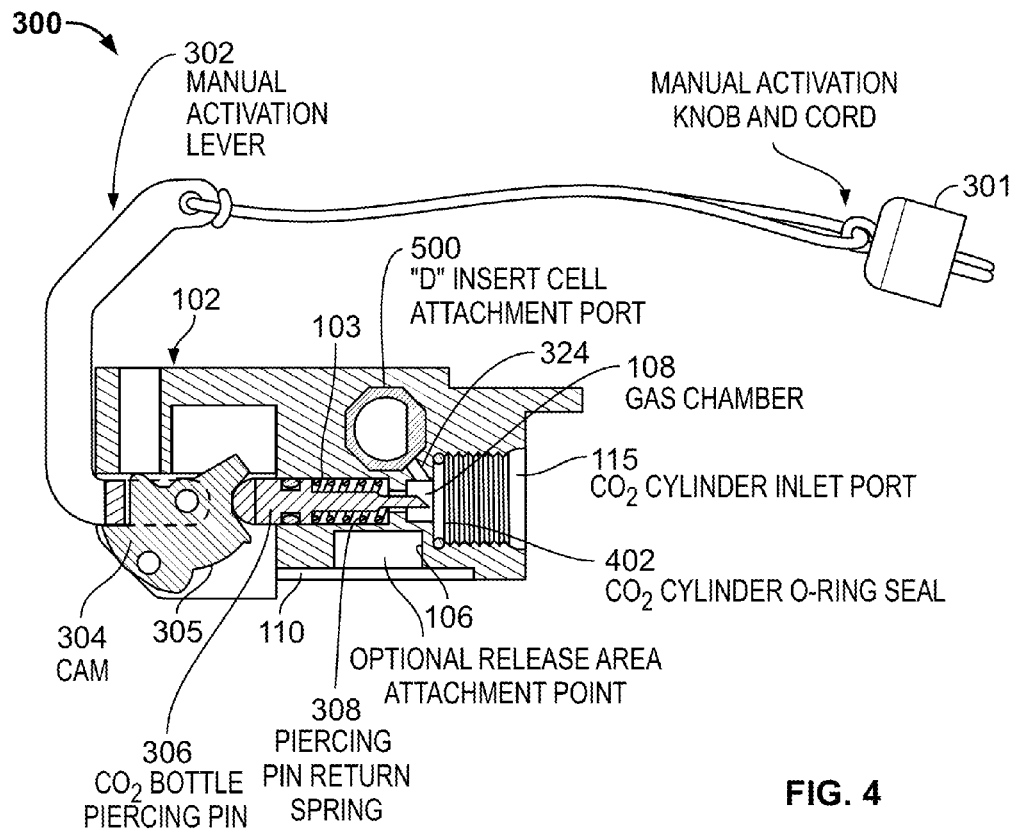
FIG. 4 is a fragmentary cutaway view of a mechanical module of the inflator system of FIG. 1.
Figure 5A:
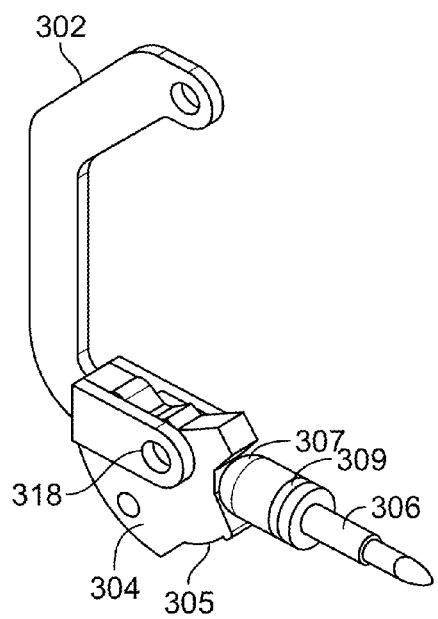
FIGS. 5A and 5B are cutaway views of illustrating a firing action method of operation of the inflator system of FIG. 1 using a mechanical module shown in FIG. 4.
Figure 5B:
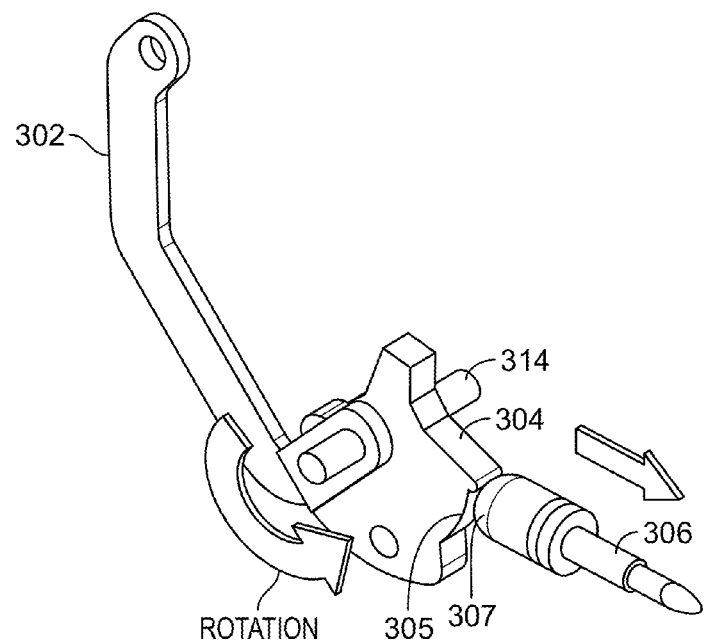

In one construction of the inflator system 100 shown in FIGS. 4 and 5A-5B, the mechanical module 300 may include of a lever 302, a cam member 304, a bottle piercing pin 306, and a helical spring 308. Optionally, the mechanical module 300 can support the addition of either a packing loop case release, or zipper closed case release (not shown). Referring to FIGS. 5A and 5B, lever 302 is pivotally mounted about a pivot pin 314. The pivot pin 314 extends into a common opening 316 in the level 302 and cam member 304. This construction retains the lever 302 and the cam member 304 on the same pin 314 and enables simultaneous rotation the cam 304 with the movement of lever 302. Referring to FIGS. 5A and 5B, the distal end 318 of the lever 302 is mattingly abutted to the cam member 304 that so rotation of the level 302 about pivot pin 314 causes the cam member 304 to simultaneously rotate.

Under manually activation, the pulling of the lever 302 counter-clockwise will rotate the cam member 304 in the counter-clockwise direction. For example, the pull cord and knob 301 may be used for ease of manual activation. The bull nose end 307 of the piercing pin 306 slides along the peripheral surfaces of the cam member 304. An arcuate peripheral surface 305 of cam member 304 engages the bull nose end 307 and pushes the piercing pin 306 forward towards and through a flexible diaphragm in the end of the metal bottle/tank 400 filled with a pressurized gas, such as carbon dioxide. After the diaphragm is punctured by the piercing pin 306, the carbon dioxide gas is released into gas chamber 108 and vented along the piercing pin 306 into fluid channel 324 to a "D" port 500 where the gas enters into an air bladder of the life preserver via a fill valve. As shown in FIG. 4, the gas chamber 108 is disposed forward of the piercing pin 306 and in front of the cylinder inlet 115. Furthermore, fluid channel 324 is a gas pathway where the inlet is connected to the gas chamber 108 and the outlet is connected to the D port 500. It is noted that the piercing pin 306 includes a gas seal 309 to prevent the pressurized gas from escaping the housing 102 other than the gas chamber 108. It should be noted that the piercing pin 306 is cylindrically shaped and provided in an tubular chamber 103 of housing 102.

In one construction, after automatic or manual operation, the piercing pin 306 is held at the end of cam member 304 stroke so that a replacement pressurized gas bottle 400 cannot be installed into cylinder inlet port 115. This feature prevents fired/spent inflator systems 100 from being mistaken for an unfired inflator system 100. Nevertheless, the fired inflator system 100 can be reset and reused, by for example, the coil spring 308 can return to the pin 306 to the starting position after the cam member 304 is rotated clockwise back to the initial position. As shown in FIG. 4, the coil spring 308 encloses or surrounds a portion of the piercing pin 306.

Activiation Circuit

Figure 6:
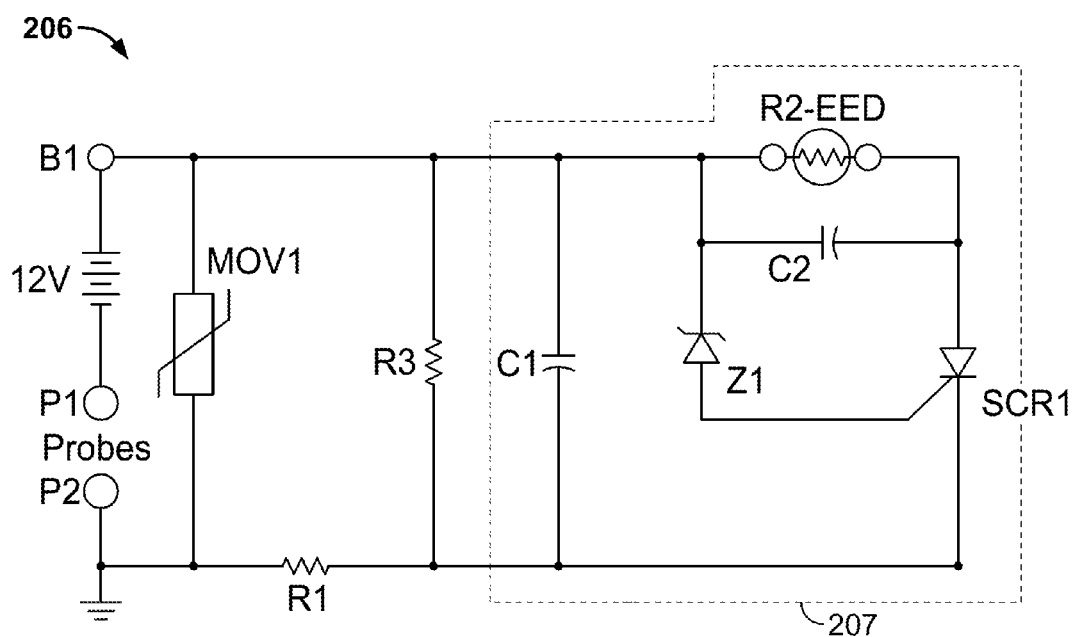
FIG. 6 is schematic diagram of a water sensing circuit according to an embodiment of the invention.
Figure 9:
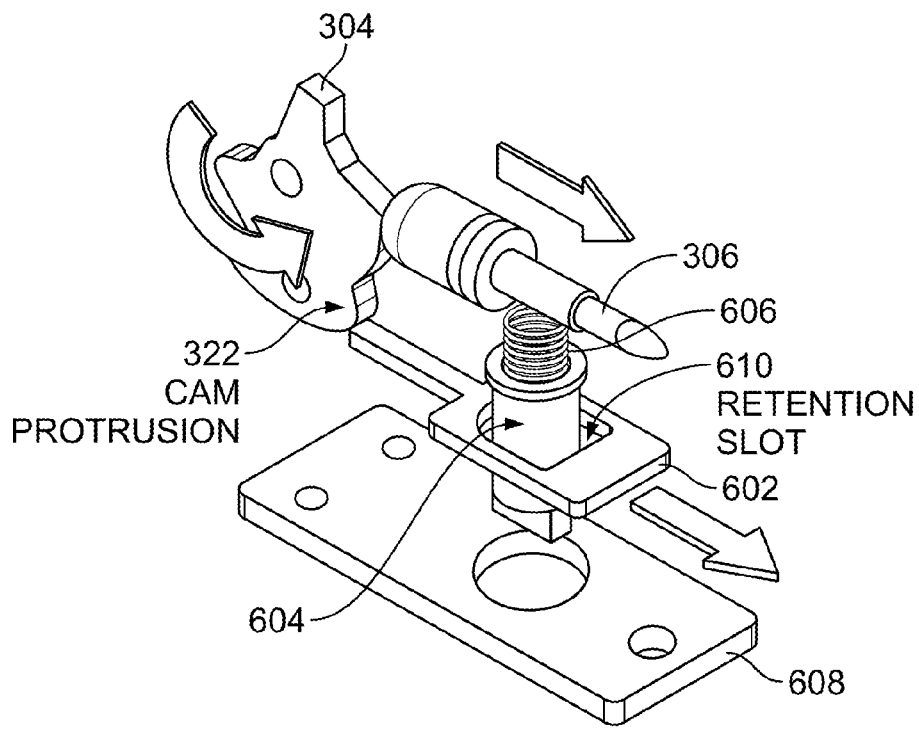
FIG. 9 is a schematic view of an alternative release system shown in FIG. 7.
Figure 10:
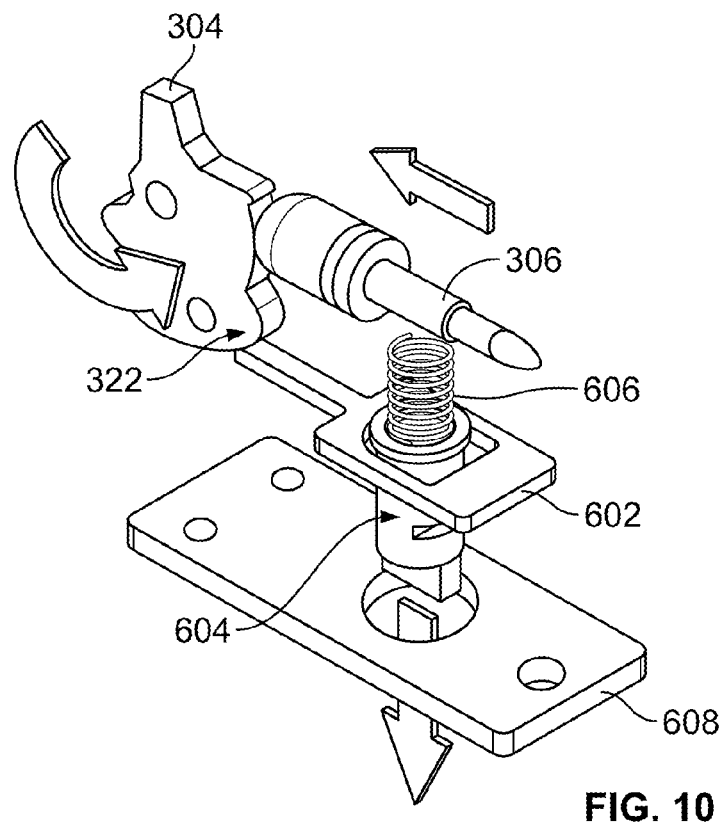
FIG. 10 is a schematic view of an alternative release system shown in FIG. 7.

Referring to FIG. 6, the water activated circuitry 206 is an improved circuit exhibiting increased Electrostatic discharge (ESD) and Radio Frequency (RF) circuit protection. The circuitry disclosed in U.S. Pat. No. 5,857,246 and U.S. Pat. No. 6,099,136 is incorporated by reference. The water activated circuit 206 is dormant type with no battery current draw until totally submerged in water. The circuitry is a capacitor discharge type with bleed resistor to afford inadvertent firing protection from splashing. The circuit draws zero current statically, since with no water across the probes there is no path for current to flow from the battery, this ensures maximum battery life. Once submerged, the water across the probes P1 and P2 provides a path for current flow.

With continued reference to FIG. 6, in operation when current between P1 and P2 flows, capacitor C1 begins charging through resistor R1, and continues to charge until it reaches the knee voltage of Zener Diode Z1. At this point, Z1 begins passing current into the gate of Silicone Controlled Rectifier SCR1, causing it to fire. Once SCR1 fires, C1 rapidly discharges through the piston actuator R2-EED (item 208 in FIG. 2). This causes the piston actuator R2-EED to fire, thereby activating the inflator system 100. The rate of charge on C1 (and thus the circuit firing time) is largely determined by the RC time constant of R1*C1. Generally, the circuit firing time equals one time constant. Should C1 receive a partial charge due to water splashing, etc. resistor R3 provides a discharge path for C1. R3 also inhibits inadvertent charging of C1 in foggy, high humidity, and rainy environments. Capacitor C2 provides increased RF shunt protection for the piston actuator. The Metal Oxide Varistor MOV1 supplies increased Electro Static Discharge (ESD) protection to the circuit 206 and piston actuator 208 shown in FIG. 2.

Alternative Release System

Referring to FIG. 7, an alternative release system 600 comprises of a release slide 602, a release barrel 604, a release spring 606, and retention cover plate 608. The release system 600 components are disposed within a slotted guide 110 and housing bore 106 machined into the lower portion of the mechanical module 200 housing. In one construction, when an additional release mechanism is not used, the area is protected with a plastic cover held in place by the same three attachment screws used to attach the various release mechanisms. The release spring 606 is retained in a central bore of the release barrel 604. The closed position, the lip 314 of the release barrel 604 is abutted at the top of the housing bore 106. The release spring 606 is provided in a compressed state when one end is abutted against the top of housing bore 106 and the opposing end is engaged against the bottom of the bore of the release barrel 604. The release spring 606 can be provided in a helical spring or coil spring construction.

Turning to FIGS. 7-10, the release system 600 is activated by the rotation of the cam member 304 during manual or automatic operation as explained previously. In operation, as the cam member 304 rotates during activation (either by the lever 302 or linear piston actuator 208), a forward protrusion 322 on the cam member 304 abuttingly engages the release slide 602. While at the same time moving the puncture pin 306 to an abutting relationship with the gas bottle seal 402. As the cam member 304 continues to rotate, the release slide 602 is linearly displaced so that it moves along the slotted guide pathway 110 in the mechanical module housing. As the slide 602 continues to move forward, it disengages from the retention slot 610 in the release barrel 604 thereby enabling the release spring 606 to freely expand/decompress to move the release barrel 604 downwardly to the open position. As the cam 304 continues its rotation, the puncture pin 306 is enabled to retract from the pierced bottle seal so as to not limit gas release and inhibit gas flow to the life preserver bladder. The puncture pin 306 is held in an extended position and locked to inhibit the inflator system 100 from a used bottle removed and replaced with a new bottle once the system 100 has activated.

This release system 600 construction enables other devices attached thereto to be physically released from the inflator system 100 as will be discussed below.

Altitude Vent Release System

Figure 17A:
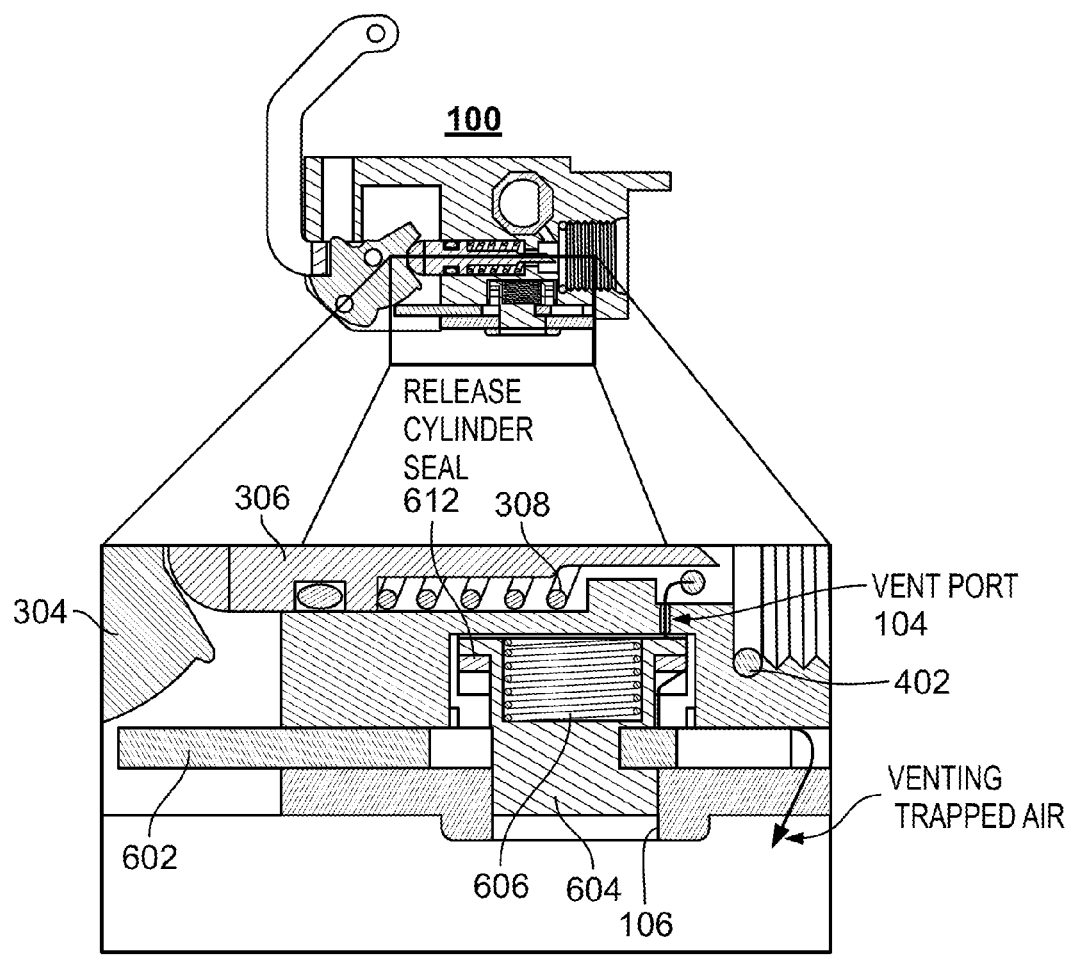
FIGS. 17A and 17B are schematic views of a vent release system according to an embodiment of the invention.
Figure 17B:
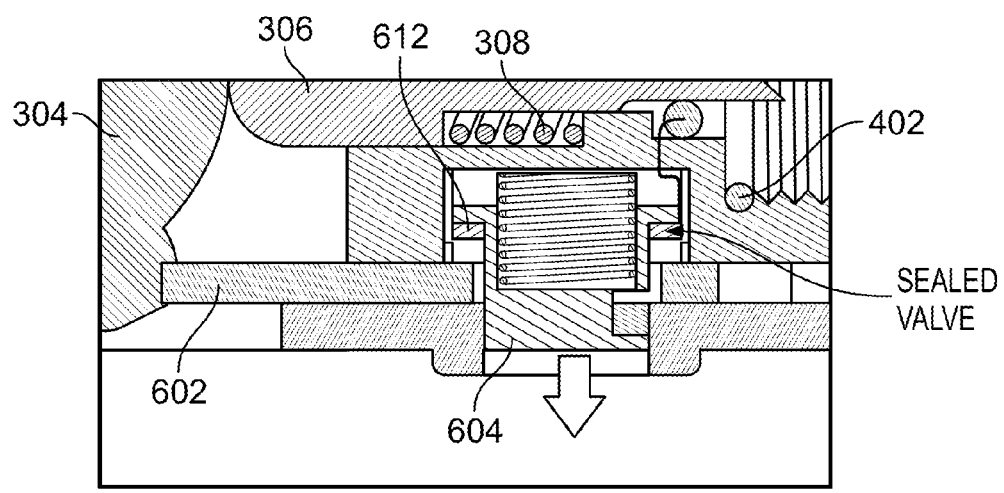

Now referring to FIGS. 17A and 17B, the inflator system 100 may include an optional altitude vent release feature which enables air trapped within the life preserver to be expelled to the ambient atmosphere, rather than expand at near space altitudes environments. This vent release feature operates immediately prior to activation of releasing pressurized gas from the bottle 400. Referring to FIG. 17A, a vent port 104 is incorporated in the release barrel bore 106 into the area housing the puncture pin 306 tip. An O-ring seal 612 is provided underneath the release barrel lip 614.

When the inflator system 100 is activated, the O-ring 612 travels downwardly against the lip 614 so as to positively seal the vent 104 to prevent the pressurized gas from leaking from the life preserver and inflator system 100. In operation, trapped air in the life preserver bladder and the gas chamber 108 is enabled to freely escape into the atmosphere, rather than expand within the life preserver bladder. As in previous disclosed when the inflator system 100 is activated (manually or electronically), the release slide 602 displaces towards the bottle 400 and enables the release barrel 604 to displace downwardly to transition to the closed position. Thus, this action seals the vent 104 and does not enable the pressurized gas in the life preserver to leak into the atmosphere.

Alternative D Port Insert

Figure 16:
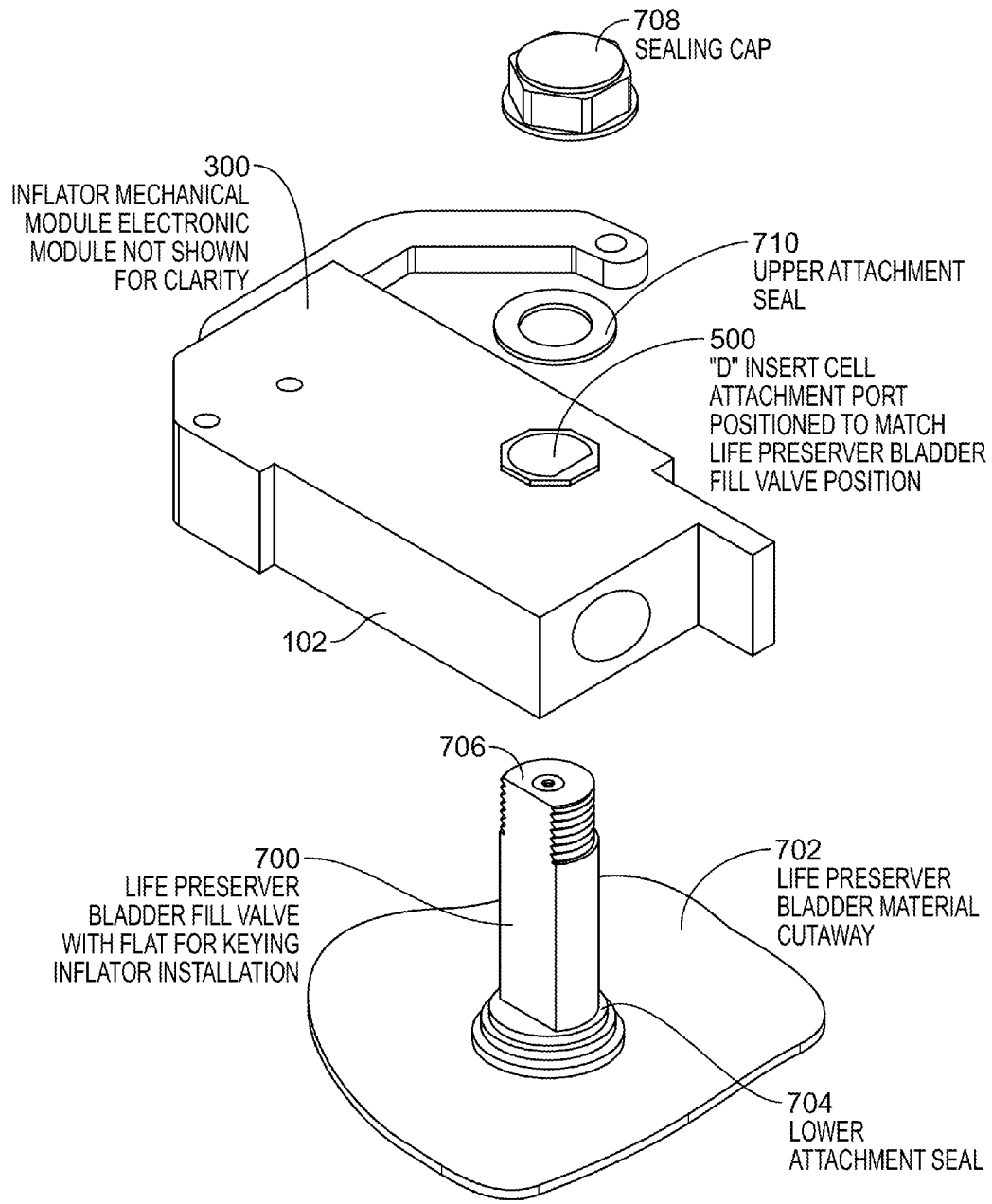
FIG. 16 is an enlarged exploded schematic view of inflator system and portion of the life preserver/bladder construction.

In one construction shown in FIGS. 1 and 11-16, the inflator system 100 incorporates a hex keyed "D" port insert member 502 which allows the device embodying the inflator system 100 to be fluidly adapted or coupled for installation on a wide variety of life preservers 702 regardless of which position the life preserver fill valve 700 (e.g. an elongated stem or shaft) is attached to the life preserver bladder 702 (See FIG. 16). Various bladder manufacturers position the life preserver fill valve 700 in multiple positions. The fill valve 700 fluidly receives the pressurized gas released from the gas bottle 400. Referring to FIG. 16, when installed on a life preserver bladder 702, the fill valve 700 is mattingly received in the "D" Port 500.

Figure 11:
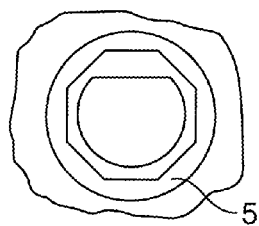
FIGS. 11-14 are fragmentary schematic views of D port insert positions.
Figure 12:
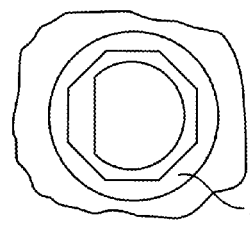
Figure 13:
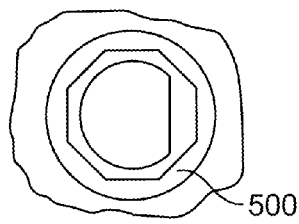
Figure 14:
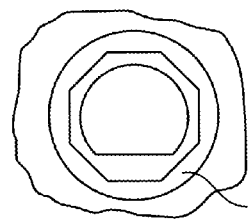
Figure 15:
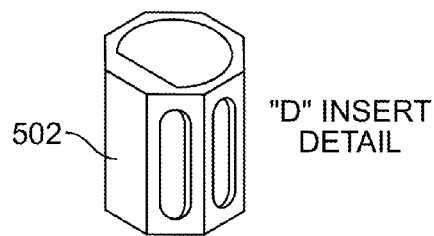
FIG. 15 is a perspective schematic view of a D port insert member according to an embodiment of the invention.

The distal end 706 of the fill valve 700 is sealed with a sealing cap 708 and upper attachment seal 710. The fill valve 700 has a lower attachment seal 704 disposed between to the life preserver bladder 702 and inflator housing 102. The inflator "D" port 500 has an insert member 502 that capable of being removed and reinserted to position the inflator on the bladder 702. FIGS. 11-14 illustrates the different positioning of the "D" insert to match bladder manufacturers valve installation. The "D" insert can be in a vertical up position as shown in FIG. 11. Alternatively, the "D" insert can be in a horizontal down left position as shown in FIG. 12. In an alternative arrangement, the "D" insert can be in a vertical down left position as shown in FIG. 13. Alternatively, the "D" insert can be in a horizontal right position as shown in FIG. 14.

Alternative Mechanical Release Devices

Figure 18A:
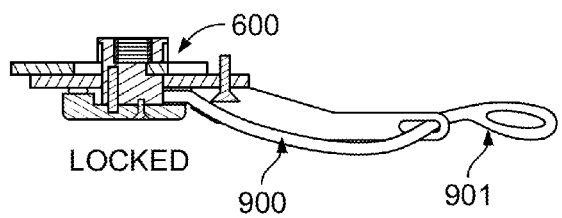
FIGS. 18A and 18B are schematic views of the mechanical release device of FIG. 7 and method of operation.
Figure 18B:
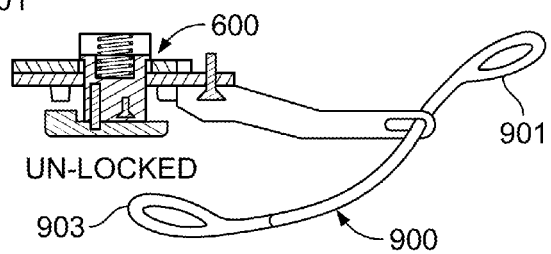
Figure 19A:
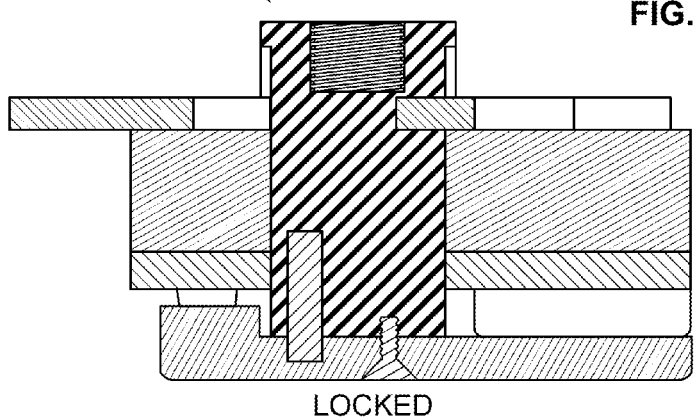
FIGS. 19A and 19B are schematic views of mechanical release device of FIG. 7 and method of operation.
Figure 19B:
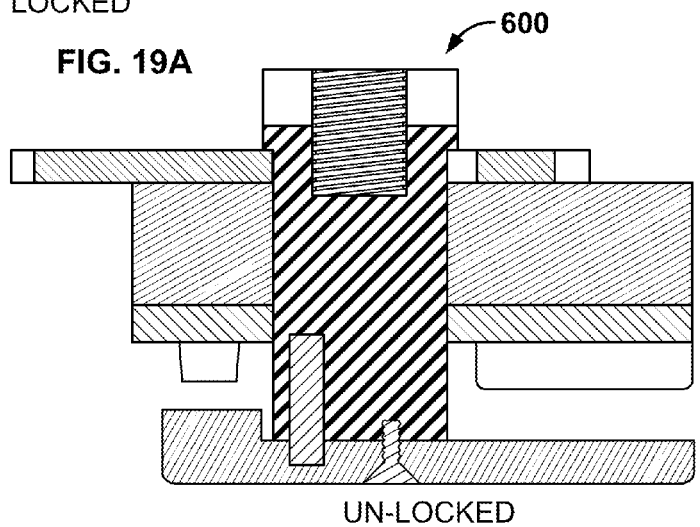

Now turning to FIGS. 18A-18A and 19A-19B, the inflator system 100 may be configured to support a number of secondary mechanical release functions that activate prior to pressurized gas being released from the bottle 400, such as release system 600. In this way, other devices coupled to the inflator system 100 can be physical released or decoupled. Current mechanical releases include but are not limited to a mechanism to release a life preserver which is packed within a fabric container secured closed by a zipper. Release mechanism 600 may release a life preserver which is packed or retained in a container which is held closed over lapping flaps that are secured closed by a loop and pin where the release of the opposite end of the looped cord will release the pack and allow the life preserver to open and the cell to fill with CO2 gas from the cylinder. A cord release module 900 facilitates the release of the pack closure cord used on the style LPU-23/P Life Preserver Assembly. Referring to FIGS. 18A and 18B, upon activation of the inflator system 100, the mechanism 600 releases a loop end 903 of the locking cord 900 allowing the life preserver pack to open.

A Zipper Release Module facilitates the release of the pack closure zipper used on the LPU-9/P style Life Preserver Assembly commercially available. Upon activation of the inflator 100, the mechanism 600 releases the zipper allowing the life preserver pack to open.

System 100 has a modular configuration in which the components can be configured operate together. All U.S. patents referred to in this application are fully incorporated by reference for all purposes. While the present invention has been described with reference to exemplary embodiments, it will be understood by those of ordinary skill in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiments disclosed, but that the invention will include all embodiments falling within the scope of the appended claims.

What is claimed:

1. An apparatus, comprising:
   a liquid sensor component moveably coupled to a cam member; and
   a piercing pin moveably configured to engage a fluid container, responsive to rotatable movement of the cam member; wherein the piercing pin includes a proximal end and a distal end;
   the cam member having a peripheral surface configured to abut and engage the pin proximal end for movement of the piercing pin between a first position and a second position so that the pin distal end is displaced towards the fluid container;
   the peripheral surface including a cavity portion configured to retain the pin proximal end therein and to retain the piercing pin in the first position;
   the peripheral surface including a linear portion configured to displace the pin proximal end during said rotatable movement of the cam member toward the fluid container for the second position;
   a linear actuator configured to moveably engage a first protrusion portion of the peripheral surface of the cam member responsive to a liquid being sensed by the liquid sensor component; and
   a slide member being moveable and having an end portion configured to engage a second protrusion portion of the peripheral surface of the cam member responsive to rotation of the cam member.

2. The apparatus according to claim 1, further comprising a lever rotatably coupled to the cam member.

3. The apparatus according to claim 1, further comprising a coil spring surrounding the piercing pin.

4. The apparatus according to claim 1, further comprising a barrel device biased to move linearly responsive to rotatable movement of the cam member via the slide member.

5. The apparatus according to claim 4, further comprising a biasing device disposed with the barrel device.

6. The apparatus according to claim 4, wherein the slide member is releasably coupled to the barrel device.

7. The apparatus according to claim 4, wherein the barrel device includes a slot and the slide member includes a portion thereof disposed within the slot of the barrel device in which the barrel device is released responsive to linear movement of the slide member.

8. The apparatus according to claim 1, further comprising an air venting apparatus operable with the movement of the cam member.

9. The apparatus according to claim 1, further comprising a fluid channel adapted to receive a fluid released from the fluid container.

10. The apparatus according to claim 1, further comprising a multiple positionable insert adapted to receive a fill valve.

11. The apparatus according to claim 1, further comprising a lever pivotably coupled to the cam member.

12. The apparatus according to claim 1, wherein the peripheral surface of the cam member includes an arcuate portion disposed between second protrusion portion and the linear engaging portion; the arcuate portion for engaging the pin proximal end to dispose the pin distal end in a third position between the first position and the second position.

13. The apparatus according to claim 1, further comprising an EMI gasket disposed at the liquid sensor component.

* * * * *